(12) United States Patent
Kurian et al.

(10) Patent No.: US 10,997,434 B2
(45) Date of Patent: May 4, 2021

(54) LANE MARKER RECOGNITION

(71) Applicant: Aptiv Technologies Limited, St. Michael (BB)

(72) Inventors: Jittu Kurian, Wuppertal (DE); Kun Zhao, Duisburg (DE); Mirko Meuter, Erkrath (DE)

(73) Assignee: Aptiv Technologies Limited, St. Michael (BB)

( * ) Notice: Subject to any disclaimer, the term of this patent is extended or adjusted under 35 U.S.C. 154(b) by 130 days.

(21) Appl. No.: 16/372,817

(22) Filed: Apr. 2, 2019

(65) Prior Publication Data

US 2019/0347491 A1 Nov. 14, 2019

(30) Foreign Application Priority Data

May 8, 2018 (EP) .................................... 18171332

(51) Int. Cl.
*G06K 9/00* (2006.01)
*G06T 7/13* (2017.01)
*G06K 9/62* (2006.01)

(52) U.S. Cl.
CPC ....... *G06K 9/00798* (2013.01); *G06K 9/6268* (2013.01); *G06T 7/13* (2017.01);
(Continued)

(58) Field of Classification Search
CPC .... G06K 9/00798; G06K 9/6268; G06T 7/13; G06T 2207/20024; G06T 2207/20081; G06T 2207/30256
(Continued)

(56) References Cited

U.S. PATENT DOCUMENTS 4,970,653 A * 11/1990 Kenue ................. G05D 1/0246
348/116
6,591,000 B1 7/2003 Oike et al.
(Continued)

FOREIGN PATENT DOCUMENTS

EP 1304607 4/2003
EP 1 918 853 A2 5/2008
EP 2 905 725 A2 8/2015

OTHER PUBLICATIONS

Meuter, Mirko, et al. "A novel approach to lane detection and tracking." 2009 12th International IEEE Conference on Intelligent Transportation Systems. IEEE, 2009. (Year: 2009).*
(Continued)

*Primary Examiner* — Jonathan S Lee
(74) *Attorney, Agent, or Firm* — Colby Nipper PLLC

(57) ABSTRACT

A method for lane marker recognition includes: providing a filter bank with a plurality of different pairs of filters adapted to detect the left edge and the right edge of a specific type of a lane marker, respectively; receiving an image of a road; dividing the image of a road into a plurality of image segments, wherein each image segment includes at least one row of pixels of the image of a road; and for each of the image segments: applying a plurality of the pairs of filters of the filter bank to the image segment to generate a plurality of filter outputs; and determining which of the filter outputs correspond to a lane marker by using geo-metric information and appearance based information, wherein the geometric in-formation describes allowable dimensions of a determined lane marker, and the appearance based information describes allowable pixel values of a determined lane marker.

15 Claims, 6 Drawing Sheets

(52) U.S. Cl.
CPC ............... *G06T 2207/20024* (2013.01); *G06T 2207/20081* (2013.01); *G06T 2207/30256* (2013.01)

(58) Field of Classification Search
USPC ........................................................ 382/104
See application file for complete search history.

(56) References Cited

U.S. PATENT DOCUMENTS

| | | | | |
|---|---|---|---|---|
| 6,819,779 B1 * | 11/2004 | Nichani | ............. | G06K 9/00798 382/104 |
| 8,108,119 B2 * | 1/2012 | Southall | .................... | B60T 7/22 701/96 |
| 8,320,628 B2 * | 11/2012 | Cheng | ................ | G06K 9/00805 382/104 |
| 8,462,988 B2 * | 6/2013 | Boon | ................. | G06K 9/00798 382/104 |
| 8,611,585 B2 * | 12/2013 | Zhang | ................ | G06K 9/00798 382/100 |
| 8,924,078 B2 * | 12/2014 | Jeromin | ............... | G06K 9/2018 701/36 |
| 9,053,372 B2 * | 6/2015 | Ranganathan | ..... | G06K 9/00798 |
| 9,205,835 B2 * | 12/2015 | Stein | ....................... | B60K 31/00 |
| 9,310,470 B2 * | 4/2016 | Moriuchi | .............. | G01S 13/345 |
| 9,659,497 B2 * | 5/2017 | Woo | .................... | G06K 9/00798 |
| 10,108,865 B2 * | 10/2018 | Nakamura | .............. | B60R 11/04 |
| 10,625,740 B2 * | 4/2020 | Nath | .................... | G05D 1/0212 |
| 10,768,006 B2 * | 9/2020 | van der Molen | .. | G01C 21/3602 |
| 10,783,382 B2 * | 9/2020 | Zhai | ..................... | G06K 9/3233 |
| 10,853,671 B2 * | 12/2020 | Mansour | .............. | G06N 3/0454 |
| 10,872,244 B2 * | 12/2020 | Bovyrin | ............. | G06K 9/00798 |
| 2008/0109118 A1 | 5/2008 | Schwartz et al. | | |
| 2013/0004084 A1 | 1/2013 | Sakurai | | |
| 2015/0227800 A1 | 8/2015 | Takemae | | |
| 2017/0337433 A1 | 11/2017 | Guo | | |

OTHER PUBLICATIONS

Kun, et al., "A Lane Recognition System Based on Priority", Nov. 2013, 4 pages.

* cited by examiner

LANE MARKER RECOGNITION

TECHNICAL FIELD OF INVENTION

This disclosure generally relates to a method for lane marker recognition, and to a lane marker recognition system adapted to perform such a method.

BACKGROUND OF INVENTION

Lane marker recognition represents a basic function of advanced driver assistance systems (ADAS). The purpose of lane marker recognition is to identify lane markers on a road in a reliable and efficient manner, for example to warn the driver if an unexpected lane change is detected that might be unintentional and hazardous for the driver. A lane recognition system uses a camera mounted on the vehicle such as to capture an image of the road ahead. The lane recognition system processes the image using a lane recognition algorithm to discover the position and width of various lane markers on the road. The lane recognition algorithm can consist of smaller algorithms. In particular, one of such sub-algorithms can represent a lane detection algorithm, wherein the function of the lane detection algorithm is to process the image of the road such as to filter out irrelevant pixel patterns and to accept only pixels which contain or are relevant for the lane marker.

Lane markers can appear in many different variations, for example with different shapes, sizes, pattern structures and orientations as defined in the traffic legislations of the country of use.

Moreover, age of a lane marker, dirt and debris on its surface, and other factors such as image and lighting conditions, can influence the appearance of the lane marker.

The thickness of lane markers can vary significantly between applications and countries, for example in the range 7 cm to 50 cm. It may also be required to identify larger white painted road areas which are wider than 50 cm, for example which extend to have a larger width than 100 cm on road surfaces.

As shown in FIG. 1, the characteristics of lane markers 100 can vary significantly in their patterns, shapes and structures, making it even more difficult to design a lane detection algorithm that accounts for all possible variations.

It follows that the task of distinguishing correctly between the different lane marker types can represent a very challenging and difficult task.

The document EP1304607A1 describes a driving lane recognition system comprising an image processing means based on a plurality of different kinds of image processing algorithms. A driving lane is detected by selecting and executing the image processing algorithm that is particularly suitable for detecting the considered marker on the road on which the vehicle is running.

More specifically, the image processing algorithm, that is the most suitable for detecting the driving lane on the road on which the vehicle is running, is selected out of a plurality of applicable image processing algorithms. There are provided: a white line recognition algorithm for detecting the position of a white line (including a yellow line), a raised pavement marker recognition algorithm for detecting a position of a raised pavement marker, a post cone recognition algorithm for detecting a position of a post cone, and a road surface pattern recognition algorithm for detection a road surface pattern. For each situation, the image processing algorithm is selected based on its recognition confidence.

The document "A lane recognition system based on priority" by Zheng Kun, et. al., 2013 IEEE Global High Tech Congress on Electronics, INSPEC: 14162014, proposes a real-time detection of lanes using ROI (region of interest) based priority settings. The ROI is divided into two regions of different priorities. The left line of the lane, detected in the left region, is given a higher priority, and the other line of the lane is deduced using camera calibration. The approach implements Hough transform based line detection such as to reduce the time of image processing and improve the real-time performance of the system.

One common method to detect lane markers is to threshold the image of a road to detect pixels having intensity levels corresponding to lane markers. Unfortunately, this method is not very efficient and can easily produce misclassifications.

For example, thresholding can leave out worn-out lane markers, at least in part, and thus create classification errors. Similarly, the confidence of classification can strongly depend on imaging and lighting conditions, for example due to changing weather conditions and the time of day, or may depend on shadow or darkening effects influencing pixel intensities in an unpredictable manner, for example: dark patches on the road, changes in brightness during tunnel entry and exit, etc.

Other methods use edge detectors to determine the edges of lanes. However, using a single edged detector to detect either the left or right edge of a lane marker, wherein the lane marker can have any size or shape, can easily result in false detections. In particular, a lane marker recognition based on single edge detection fails to consider the width of the lane marker, and thus fails to distinguish between many types of lane markers. The spatial precision of the edge detection may be improved for thin lane markers by using a filter kernel having small dimension, i.e. a small filter operator. However, at the same time, applying a small filter operator on a large lane marker can easily produce unwanted detections of those lane markers. Thus, single sided edge detector operators are not well suited to distinguish between different lane markers based on their widths.

Similarly, methods using filters to match defined fractions or patterns of lane markers in the image of a road are impractical and difficult to implement. In fact, such a pattern recognition scheme must cover all conceivable lane markers, for example, all straight and differently patterned lane markers having a width in the range 7 cm to 50 cm. Moreover, because of camera perspective, the pattern recognition must also allow for all possible angular variations of the lane markers.

It follows that pattern recognition approaches can require an infeasibly huge set of templates to be considered, in particular if many possible lane marker types are to be detected and distinguished.

SUMMARY OF THE INVENTION

Techniques are described herein to improve the efficiency and reliability of lane marker recognition, in particular to provide an approach allowing to distinguish between different lane marker types in a robust manner.

In accordance with a first aspect of the present invention, a method for lane marker recognition includes: providing a filter bank with a plurality of different pairs of filters adapted to detect the left edge and the right edge of a specific type of a lane marker, respectively, and receiving an image of a road, dividing the image of a road into a plurality of image segments. Each image segment includes at least one row of pixels of the image of a road. The method also includes, for each of the image segments: applying a plurality of the pairs of filters of the filter bank to the image segment to generate a plurality of filter outputs, and determining which of the filter outputs correspond to a lane marker by using geometric information and appearance based information. The geometric information describes allowable dimensions of a determined lane marker, and the appearance based information describes allowable pixel values of a determined lane marker.

In other words, in the first stage of the method, a filter bank with a plurality of different pairs of filters is provided. The filters can correspond to image processing filter kernels having different sizes and shapes.

The sizes and shapes of the filters can be tailored to address with each filter a special case of a lane marker type. For example, the size of a filter can be tailored based on a defined width range of lane markers which the filter operator is intended to detect.

For example, by reducing the size of the filter, the spatial resolution of the filter may be improved, for example to distinguish between closely spaced lane markers. By increasing the size of the filter, the detection of larger and wider lane markers can be improved, for example by enhancing the noise cancellation properties of the filter or by reducing the filter responsiveness to irrelevant fragments of lane marker patterns.

In other words, the filters of the filter bank can be adapted to respond to different types of lane markers, respectively. In this way, a plurality of pairs of filters of the filter bank can be used to detect and distinguish between a wide range of lane markers in a reliable and efficient manner.

For the purpose of applying the different filters to detect and distinguish between different lane markers, the method according to the present invention comprises receiving an image of a road, dividing the image of a road into a plurality of image segments, and applying a plurality of the pair of filters of the filter bank to each of the image segments. In an example, all of the pairs of filters of the filter bank are applied to each of the image segments.

Preferably, each image segment includes at least one row of pixels of the image of a road, further preferred at least one horizontal row of pixels of the image of a road. For example, a plurality of pairs of filters can be applied to a set of horizontal rows of pixels of the image, in particular to a set of neighboring horizontal rows of pixels of the image. By reducing the number of horizontal rows in each image segment, the filter output will be less sensitive to vertical perspective distance projections as seen from the point of view of the camera.

A plurality of filter outputs is generated by applying a plurality of the pairs of filters of the filter bank to each of the image segments. The filter outputs are evaluated to determine which of the filter outputs correspond to a lane marker. For this purpose, geometric information and appearance based information is used for determining if a filter output corresponds to a lane marker, wherein the geometric information describes allowable dimensions of a determined lane marker, and the appearance based information describes allowable pixel values of a determined lane marker.

For example, the geometric information can correspond to geometrical constraints, for example constraints defining plausible shapes of the detected lane marker, in particular defining plausible widths of the detected lane marker.

In other words, geometric information is used for determining if the filter output of a filter corresponds to plausible dimensions of a lane marker. In this way, the filter outputs are classified to determine plausible lane marker detections.

The appearance based information describes allowable pixel values of a determined lane marker in an image region enclosing the detected edges of the lane marker. Preferably, the image region enclosing the detected edges of the lane marker corresponds to a line of pixels of the image of the road overlapping both edges of the lane marker. For example, the image region corresponding to a line of pixels of the image of the road can overlap each edge of the lane marker by a length d/2, where d is the determined distance between the edges.

Preferably, the appearance based information describes allowable normed pixel values in said image region. For example, if the image region corresponds to said line having a length 2d, its respective pixel values, for example grayscale values, can be defined as $I(x)$, $x \in [0, 2d]$ and the corresponding normed pixel values as $f(x) = I(x)/\|I(x)\|$, where $\|\cdot\|$ is the L2 norm operator. Preferably, the pixel values $I(x_i)$ or normed pixel values $f(x_i)$ are sampled at discrete samples $x_i$ such as to derive a feature vector used for finite dimension classification, for example in a machine learning classifier and/or support vector machine classifier.

Accordingly, the appearance based information allows further enhancing the lane marker classification performance by considering the allowable pixel values of a determined lane marker.

Preferably, the filter outputs are first evaluated to determine which of the filter outputs complies with the geometric information, and if this is the case for at least one of the filter outputs, a second evaluation step is performed to determine which of the filter outputs complying with the geometric information also complies with the appearance based information. In this way, the appearance based information is only used if expedient, improving the efficiency of the lane marking recognition method.

It follows that by using and classifying the outputs of the differently sized and shaped filters, it is possible to design the filters of the filter bank such as to detect each of a wide variety of lane markers in a precise, reliable and robust manner.

For example, individual filters can be designed to identify country specific lane markers, or to respond to wide white areas with improved detectability.

Filters can also be designed to be immune or less sensitive to damages in the lane markers, e.g. to missing or obscured parts of a lane marker. For example by defining a larger filter for interpolating missing parts of the lane marking, or by defining a filter that is well matched and correlated to the pattern of the lane marker and thus less sensitive to noise or gaps in the lane marker.

Similarly, as each filter can be designed to detect a particular type of lane markers with high accuracy, the approach provides a reliable method to distinguish between the different types of lane markers, for example to provide the driver of a vehicle with safety relevant information in an advanced driver assistance system (ADAS).

According to the present invention, the different pairs of filters of the filter bank are adapted to detect edges of different types of lane markers.

For example, the different pairs of filters of the filter bank can be adapted to correspond to detectable features which are characteristic for particular types of lane markers.

In this respect, a narrow filter corresponds to a small filter operator that is well suited for detecting narrow lane markers.

By contrast, larger filter operators can improve the detection of wider lane markers. For example, very large white painted surfaces on roads can be detected by using extra wide operators, which can correspond to more than 50 cm, depending on the maximum width of the lane marker being detected. Moreover, large filter operators can also be designed to respond to patterned lane markers, such as for example by averaging or matching the patterns of the lane markers shown in FIG. 1.

Hence, different operators can be designed to detect different kinds of lane markers, for example by adapting segments of the filter to correspond to thicknesses or pixel patterns of the different detectable lane markers.

As mentioned above, a plurality of pairs of filters of the filter bank is applied on image segments of the image of a road to detect the different lane markers. Each image segment can include at least one row of pixels of the image of a road, for example at least one horizontal row of pixels of the image of a road. By reducing the number of horizontal rows in each image segment, the filter output will be less sensitive to vertical perspective distance projections as seen from the point of view of the camera.

Preferably, each image segment corresponds to a single row of pixels of the image, further preferred to a single horizontal row of pixels of the image. In this way, the sensitivity to vertical perspective distance projections is reduced. Moreover, by applying the filters to single rows of pixels of the image, the filter kernels can be one-dimensional, simplifying the computational processing of applying the different filters.

Preferably, at least one of the filters of the filter bank is a symmetric filter. In other words, at least one of the filters of the filter bank is symmetrical about its center. This selection of a filter can be advantageous when the filter response is tuned to detect symmetrical characteristics in the lane markers. For example, a symmetrical filter can be effective to detect the center line of a symmetrical lane marker or symmetrical patterns of a lane marker.

Similarly, at least one of the filters of the filter bank is preferably an asymmetric filter having a filter response that is tuned to detect asymmetrical characteristics in the lane markers.

For example, it can be expedient to use asymmetrical filters to detect closely spaced lane markers. More specifically, the close proximity of the lane markers can cause each of the lane markers to influence the detection of the other lane marker, such as to skew the symmetry of their perceived shapes.

Similarly, lane markers positioned close to some bright surface, like for example a guard rail, can in some circumstances be more efficiently detected by using an asymmetrically shaped filter.

In an example, the asymmetric filter can represent a gradient filter, such as to detect a change (or first derivative) of pixel intensities in an image segment. For example, the gradient filter can be used to detect discontinuities or edges in the image segment, for example to detect the edges of a lane marker. Moreover, the gradient based filters can have different sizes and shapes such as to improve the detection of edges of different types of lane markers.

In an example, the asymmetric gradient filters correspond to a step function.

Preferably, at least one of the filters of the filter bank is a gradient filter adapted to detect left edges of lane markers, or at least one of the filters of the filter bank is a gradient filter adapted to detect right edges of lane markers.

It is further preferred that two filters of the filter bank represent two mirrored asymmetric gradient filters. In this way, the two mirrored gradient filters have mirrored characteristics, but are identical other than that, allowing said detection of both the left and right edges of a particular type of a lane marker.

As mentioned above, after applying a plurality of the pairs of filters of the filter bank to the image segment, the method according to the present invention determines which of the filter outputs correspond to a lane marker by using geometric information and appearance based information.

Preferably, the determining which of the filter outputs correspond to a lane marker by using geometric information includes pairing the filter outputs of two mirrored asymmetric gradient filters such as to determine the thickness of a lane marker.

More specifically, as mentioned above, two mirrored gradient filters having mirrored characteristics can allow the detection of both the left and right edges of a particular type of a lane marker. This combined edge detection can provide the information required to determine the thickness of a lane marker, representing the distance between the left and right edges of the lane marker.

Preferably, the step of determining which of the filter outputs correspond to a lane marker by using geometric information includes comparing the determined thickness of a lane marker to the geometric information.

For example, the geometric information can define plausible thicknesses of a lane marker, which are compared to the determined thickness of a lane marker.

In this respect, the plausible thickness or other geometric information can vary between the different types of detected lane markers. For example, a lane marker detected by a small filter operator can be expected to be narrower than a lane marker detected by a large filter operator.

In view of this, it is preferred that the geometric information depends on characteristics of the paired filters, such that different geometric information can be used for different filters of the filter bank.

In an example, the geometric information is mapped into a thickness of the lane marker corresponding to the longitudinal distance to edges of the lane marker as detected by the filter outputs of the paired filters.

More specifically, the pair of mirrored filters detects the right and left edges of a specific type of lane marker, at a particular vertical position in the image of a road.

The vertical position corresponds to the position of the image segment being filtered. For example, if the image segment corresponds to a horizontal row or rows in the original image of a road, the vertical position corresponds to the position of the particular horizontal row or rows in the original image of a road. Accordingly, the edges of the lane marker are detected at a certain longitudinal distance as seen from the point of view of the camera.

In order to compensate the perspective projection of the camera view, the plausible thickness of a lane marker is determined by mapping the geometric information into a thickness of the lane marker corresponding to the longitudinal distance to the detected edges.

In this way, any angular variation of the lane marker does not affect the classification, because only one horizontal row, or a small number of neighboring horizontal rows, are being considered by the mirrored filter.

Preferably, the determined thickness of the lane marker is between 7 cm and 100 cm, further preferred between 7 cm and 50 cm, when measured on the road surface.

Preferably, the step of determining which of the filter outputs correspond to a lane marker by using geometric information and/or appearance based information is performed by a machine-learning based classifier, preferably by a neural network.

Hence, a lane marker detection method is provided which can be applied independent of width of the lane marker and its angular orientation.

In this respect, a plurality of the filters which are being applied to detect the various types of lane marker detection, can, preferably, share the same or a similar filter structure and framework. For example, at least two of the filters of the filter bank can have the same filter structure, and thus differ only in their parameters.

In a second aspect of the present invention, a lane marker recognition system is provided that is adapted to perform the above method of the present invention. For this purpose, the lane marker recognition system includes: a camera for receiving an image of a road, and an image processing means including a filter bank with a plurality of different pairs of filters adapted to detect the left edge and the right edge of a specific type of a lane marker, respectively. The image processing means is adapted to: divide the image of a road into a plurality of image segments, preferably wherein each image segment includes at least one row of pixels of the image of a road, and for each of the image segments: apply a plurality of the pairs of filters of the filter bank to the image segment to generate a plurality of filter outputs, and determine which of the filter outputs correspond to a lane marker by using geometric information and appearance based information, wherein the geometric information describes allowable dimensions of a determined lane marker, and the appearance based information describes allowable pixel values of a determined lane marker.

Further features and advantages will appear more clearly on a reading of the following detailed description of the preferred embodiment, which is given by way of non-limiting example only and with reference to the accompanying drawings.

BRIEF DESCRIPTION OF DRAWINGS

Further embodiments of the present invention are described in the following description of Figures. The present invention will be explained in the following by means of embodiments and with reference to drawings in which is shown.

DETAILED DESCRIPTION

Figure 1:
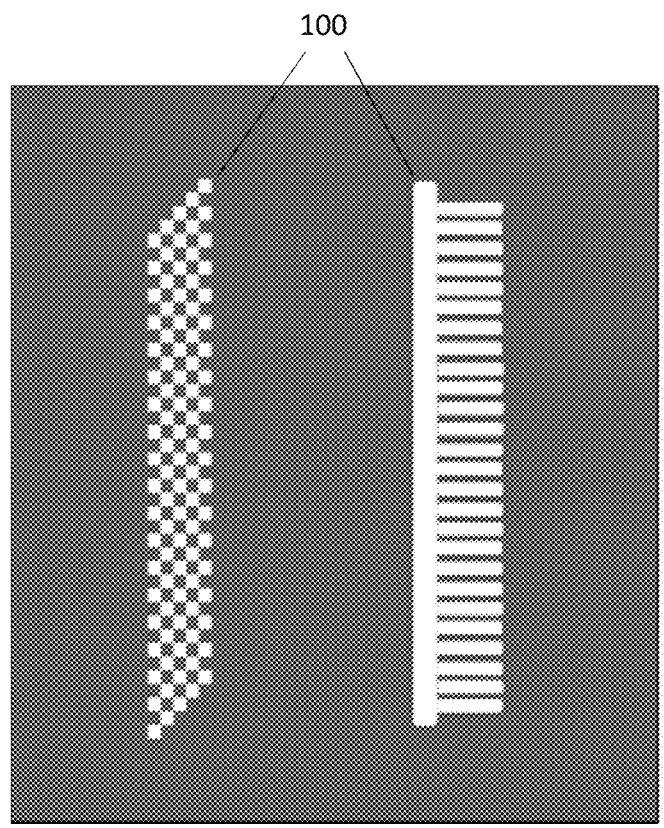
FIG. 1 illustrates two different types of lane markers.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

In the following, any statement made having regard to the direction of a component are made relative to the position shown in the drawing and can naturally vary in the actual position of application.

Figure 2:
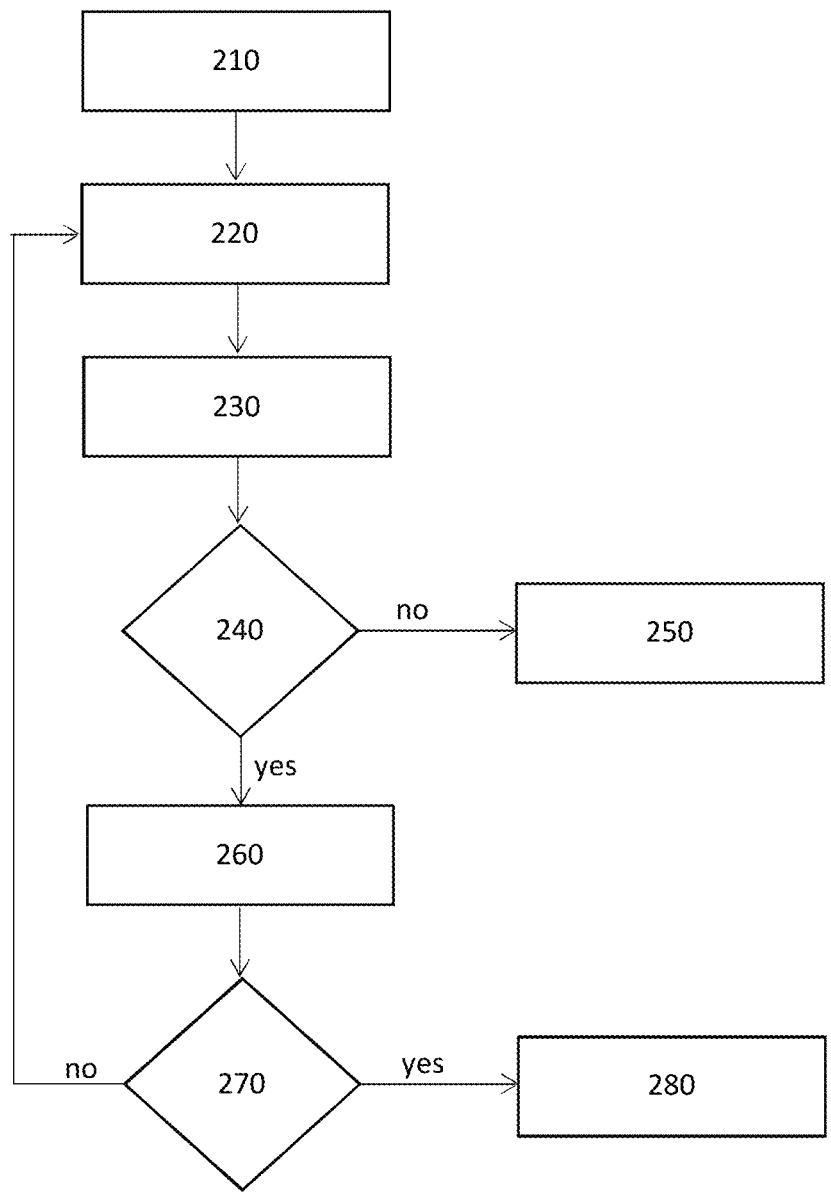
FIG. 2 illustrates a method for lane marker recognition.

FIG. 2 shows a method for lane marker detection 200 in accordance with the present invention. The method is initiated in step 210 by receiving an image of a road, and dividing the image into a plurality of image segments. In this example, each of the image segments is defined to include only one horizontal row of pixels of the image of a road.

In step 220, one of the image segments is selected for filtering, and in step 230, the filtering of the selected image segment is performed.

The selected image segment is filtered by applying a plurality of pairs of filters to the image segment. The plurality of pairs of filters belongs to a filter bank, and the sizes and shapes of the filters has each been tailored to respond to the left and right edges of a particular case of a lane marker type. For example, the size of a filter can be tailored to respond to a particular width range of lane markers.

In this respect, a narrow filter corresponds to a small filter operator that is well suited to detect narrow lane markers, whereas a larger filter operator can improve the detection of wider lane markers.

Figure 3:
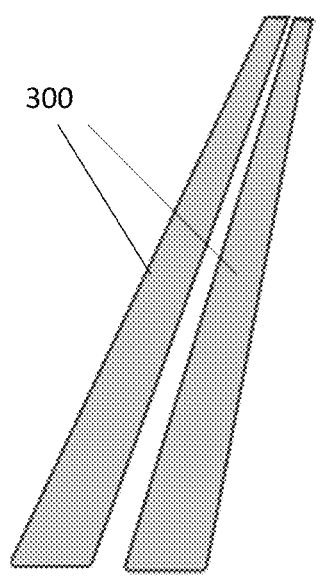
FIG. 3 illustrates two closely spaced lane markers.

FIG. 3 shows an example wherein two closely spaced lane markers 300 are to be detected. For this purpose, a small sized filter can enhance the spatial resolution of detection, allowing to distinguish between the closely spaced lane markers 300. It can also be expedient to use asymmetrical filters to detect the closely spaced lane markers 300, because the close arrangement of the lane markers can cause each of the lane markers 300 to influence the detection of the other lane marker 300, such as to skew the symmetry of their perceived shapes.

Figure 4:
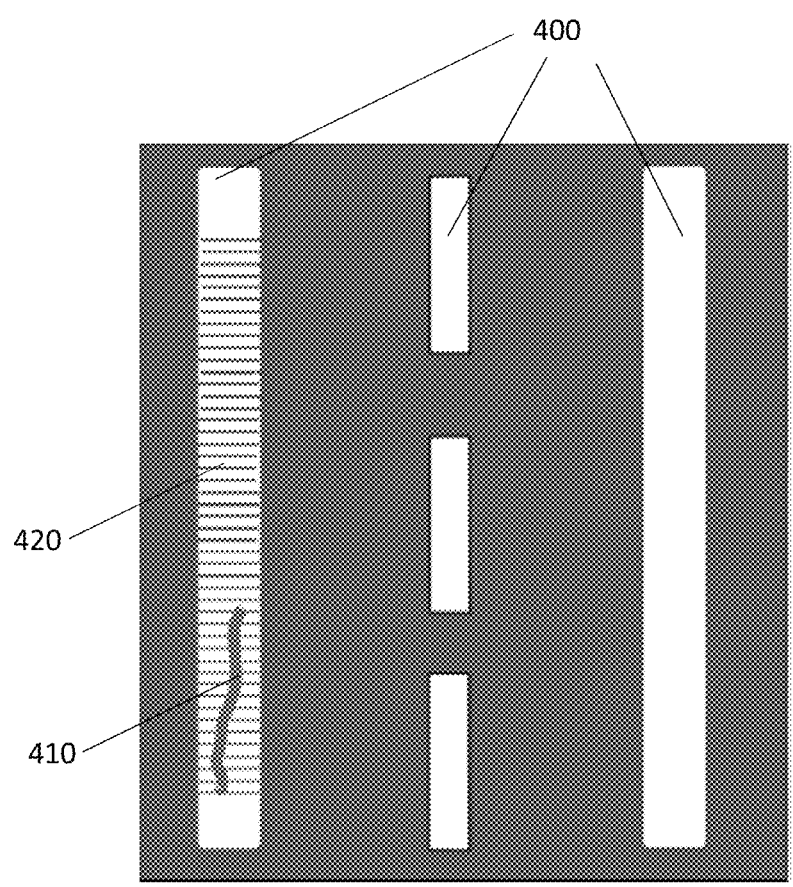
FIG. 4 illustrates a lane marker with skid marks.

FIG. 4 shows a different example of lane markers 400 wherein one of the lane markers is damaged or has an impaired appearance due to debris, wear-off or marks left on the lane marker. In this example, a skid mark 410 has been left on the left-most lane marker 400, for example by locked tires during braking. In this case, using a large filter operator for the lane marker detection, indicated as lines 420 in the figure, has the advantage that discontinuity in the marker can be ignored by the filter. In other words, the larger filter is less responsive to damages or impaired appearance of the lane marker.

By contrast, using a small filter on the lane marker 400 shown in FIG. 4 can easily result in the false detection of two independent narrow lane markers, at each side of the skid mark 410, instead of detecting only the single lane marker 400 including the skid mark 410.

In any case, the method shown in FIG. 2 continues in step 240 by determining which of the filter outputs correspond to a lane marker. For this purpose, geometric information and appearance based information is used for determining if a filter output corresponds to a lane marker. Here, the geometric information describes allowable dimensions of a determined lane marker, and the appearance based information describes allowable pixel values of a determined lane marker.

For example, the geometric information provides geometrical constraints, in particular geometrical constraints defining plausible widths of a detected lane marker. Thus, if the geometric constraints indicate that certain filter outputs do not correspond to plausible widths of lane markers, the respective filter outputs are rejected in step 250. Otherwise, a second evaluation step is performed to determine which of the filter outputs complying with the geometric information, also comply with the appearance based information.

Figure 5:
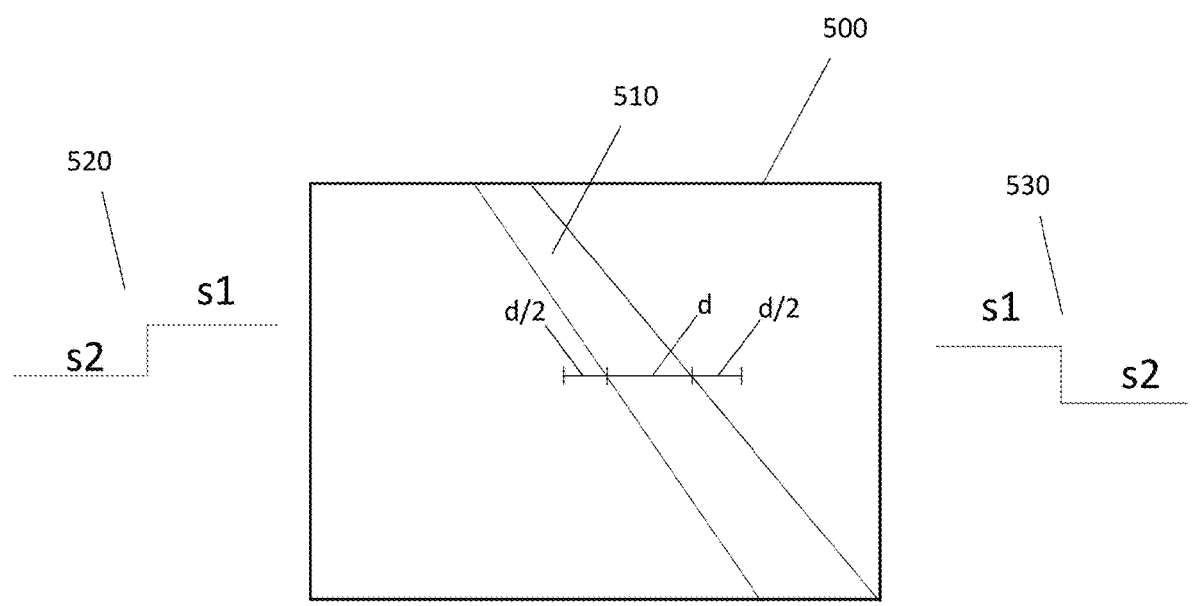
FIG. 5 illustrates an edge detection of a lane marker.

In this example, the appearance based information describes allowable normed pixel values in an image region. The respective image region corresponds to a line of pixels having a length 2d, and as shown in FIG. 5, overlapping both edges of the lane marker by a length d/2, wherein the distance between the determined edges is d. The grayscale values of the pixels defined by the image region are denoted by $I(x)$, $x \in [0,2d]$, and the corresponding normed pixel values by $f(x)=I(x)/\|I(x)\|$, where $\|\cdot\|$ is the L2 norm operator. The normed pixel values $f(\cdot)$ are sampled at discrete samples $x_i$ such as to derive a feature vector $f(x_i)$.

The feature vector is then used for determining if the respective filter output corresponds to a lane marking by using a support vector machine classifier. If this is the not the case, the filter outputs are rejected in step 250. Otherwise, the filter outputs, or information corresponding to the lane marker detected by the respective filters, is stored in step 260 as representing a valid lane marker detection. For example, validly detected lane marker information can be stored and forwarded to subsequent algorithms of an advanced driver assistance systems (ADAS) for further processing.

In step 270, a check is made if all image segments have been processed. If this is the case, the method is terminated in step 280. Otherwise, the method is redirected to step 220 such as to continue by processing the next remaining image segment.

FIG. 5 shows a corresponding edge detection being performed on a lane marker. Here, the image of a road 500 shows a perspective view of a lane marker 510 as seen from the point of view of a camera mounted on a vehicle.

More specifically, two asymmetric gradient filters 520, 530 are defined to detect discontinuities or edges in each row of the image of a road 500, i.e. in each image segment.

The asymmetric gradient filters 520, 530 each correspond to a step function to represent two mirrored asymmetric gradient filters 520, 530. More specifically, the respective step functions define a step between the filter coefficient values +1 and −1, wherein S1 defines the width of the +1 segment of the filter and S2 defines the width of the −1 segment of the filter, for example as the number of pixels belonging to each of the segments. In accordance with the above description, the widths S1, S2 of the segment of the filters define sizes of the filters that can be selected to correspond to characteristics of the lane marker 510 for improved detection.

In this example, the first gradient filter 520 is adapted to detect left edges of the lane marker 510 and the second gradient filter 530 is adapted to detect right edges of the lane marker 510. The gradient filters 520, 530 have mirrored characteristics, but are identical other than that, allowing the detection of both left and right edges of a particular type of a lane marker 510.

It follows that both edges of the lane marker 510 are detected by a pixel row specific pair of filter outputs provided by the two mirrored asymmetric gradient filters 520, 530. This information allows determining the thickness d of the lane marker 510 at that particular pixel row position.

Then, in order to determine if the filter outputs correspond to a lane marker, the filter outputs are evaluated by using geometric information and appearance based information.

For this purpose, the plausible thickness of the detected lane marker 510 at the specific row position is determined by mapping the geometric information into a lane marker thickness corresponding to the row of detection. In this example, the plausible thickness of the lane marker 510 is defined by the geometric information as belonging to the range 7 cm to 50 cm when measured on the road surface.

More specifically, the pair of mirrored filters 520, 530 detects the right and left edges of the lane marker 510 at a particular vertical position of an image segment in the image of a road 500. The vertical position corresponds to the position of the horizontal row of pixels being filtered, i.e. the row position where the distance d between the left and right edges of the lane marker 510 is being determined. Accordingly, the edges of the lane marker are detected at a certain longitudinal distance as seen from the point of view of the camera.

In order to compensate the perspective projection of the camera view, the plausible thickness of a lane marker 510 is adjusted to be compared with the lane marker width as seen at the horizontal row of edge detection. For this purpose, the geometric information is mapped into a thickness of the lane marker 510 corresponding to the longitudinal distance to the detected edges. Alternatively, the detected thickness d of the lane marker could be mapped to compensate the perspective projection of the camera, such as to allow direct comparison with the plausible lane marker width defined by the geometric information.

For example, due to the perspective projection of the camera view, the plausible thickness of the lane marker 510 shown in FIG. 2 is smaller at the upper part of the image 500 than at the lower part of the image 500. Thus, in order to compare the detected thickness d of the lane marker 510 at a particular pixel row position, the geometric information is mapped to correspond to a plausible thickness at the particular row position where the edges are being detected by the mirrored asymmetric gradient filters 520, 530.

In this way, any angular variation of the lane marker does not affect the classification, in particular because only one pixel row is being considered by the mirrored filters, further simplifying the correction of the perspective projection of the camera view.

In an example, the geometric information can vary between the different types of detected lane markers. For example, a lane marker 510 detected by a small filter operator can be expected to be narrower than a lane marker detected by a large filter operator.

In view of this, the geometric information can be adapted to depend on characteristics of the paired filters 520, 530, for example on the size of the filters 520, 530 such that different geometric information can be used for different filters of the filter bank.

In any case, the task of determining which of the filter outputs correspond to a lane marker 510 by using geometric information can be performed by a neural network, Preferably, the neural network has been trained to compensate the perspective projection of the camera view and to classify the outputs of the filters based on the corresponding geometric information.

Similarly, the above described subsequent step of determining which of the filter outputs complying with the geometric information also complies with the appearance based information, can be performed using a machine learning classifier, for example a support vector machine classifier.

Figure 6:
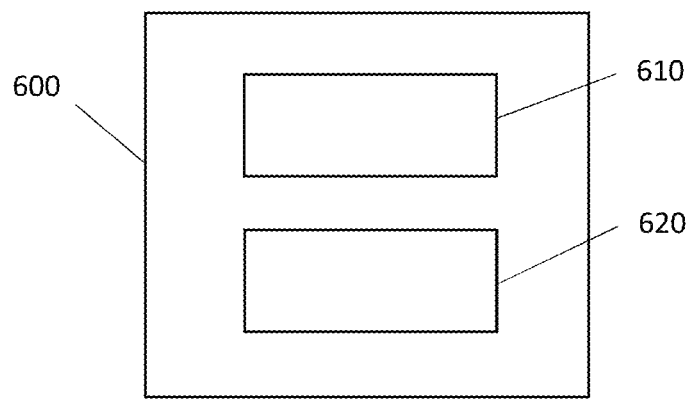
FIG. 6 illustrates a lane marker recognition system.

FIG. 6 shows a lane marker recognition system 600 that has been adapted to perform the method shown in FIG. 2. For this purpose, the lane marker recognition system 600 comprises a camera 610 for receiving an image of a road, and an image processing means 620.

The image processing means 620 includes a filter bank with a plurality of different pairs of filters adapted to detect the left edge and the right edge of a specific type of a lane marker, respectively, and the image processing means 620 is adapted to: divide the image of a road into the plurality of image segments, apply a plurality of the pairs of filters of the filter bank to the image segment to generate a plurality of filter outputs, and finally to determine which of the filter outputs correspond to a lane marker by using the geometric information and the appearance based information, wherein the geometric information describes allowable dimensions of a determined lane marker, and the appearance based information describes allowable pixel values of a determined lane marker.

It follows that by using and classifying the outputs of the differently sized and shaped filters, it is possible to design pairs of filters of the filter bank such as to detect each of a wide variety of lane markers in a precise, reliable and robust manner.

While this invention has been described in terms of the preferred embodiments thereof, it is not intended to be so limited, but rather only to the extent set forth in the claims that follow.

We claim:

1. A method for lane marker recognition, the method comprising:

providing a filter bank with a plurality of different pairs of filters adapted to detect the left edge and the right edge of a specific type of a lane marker, respectively;

receiving an image of a road;

dividing the image of a road into a plurality of image segments;

for each of the image segments: applying a plurality of the pairs of filters of the filter bank to the image segment to generate a plurality of filter outputs; and determining which of the filter outputs correspond to a lane marker by using geometric information and appearance based information, wherein the geometric information describes allowable dimensions of a determined lane marker, and the appearance based information describes allowable pixel values of a determined lane marker.

2. The method according to claim 1, wherein determining which of the filter outputs correspond to a lane marker includes using appearance based information describing allowable pixel values of a determined lane marker in an image region of the image of a road, wherein the image region encloses the detected edges of the lane marker, wherein the image region corresponds to a line of pixels of the image of the road and encloses the respective detected edges of the lane marker by overlapping both edges of the lane marker by overlapping each edge by a length d/2, wherein d is a determined distance between the edges.

3. The method according to claim 1, wherein determining which of the filter outputs correspond to a lane marker includes determining which of the filter outputs complies with the geometric information, and in response to determining that at least one of the filter outputs complies with the geometric information, determining which of the filter outputs that complies with the geometric information also complies with the appearance based information.

4. The method according to claim 1, wherein the different pairs of filters of the filter bank are adapted to detect edges of different types of lane markers by adapting segments of the filters to correspond to thicknesses or pixel patterns of the lane markers.

5. The method according to claim 1, wherein each image segment includes at least one row of pixels of the image of a road, wherein each image segment corresponds to a single horizontal row of pixels of the image of a road.

6. The method according to claim 1, wherein at least one of the filters of the filter bank is a symmetric filter.

7. The method according to claim 1, wherein at least one of the filters of the filter bank is an asymmetric filter, the asymmetric filter represents a gradient filter, and the two filters of a pair of filters of the filter bank represent two mirrored asymmetric gradient filters or each of the asymmetric gradient filters corresponds to a step function.

8. The method according to claim 7, wherein determining which of the filter outputs correspond to a lane marker by using geometric information includes pairing the filter outputs of the two mirrored asymmetric gradient filters such as to determine the thickness of a lane marker.

9. The method according to claim 8, wherein determining which of the filter outputs correspond to a lane marker by using geometric information includes comparing the determined thickness of a lane marker to a geometric information.

10. The method according to claim 9, wherein the geometric information defines a plausible thickness of a lane marker.

11. The method according to claim 10, wherein the geometric information depends on characteristics of the paired filters, such that different geometric information can be used for different filters of the filter bank.

12. The method according to claim 10, wherein the geometric information is mapped into a plausible thickness of a lane marker corresponding to the longitudinal distance to edges of the lane marker as detected in the image of a road by the filter outputs of the paired filters.

13. The method according to claim 12, wherein the determined thickness of a lane marker corresponds to a lane marker thickness in the range between 7 cm and 100 cm, as measured on the road surface.

14. The method according to claim 9, wherein the step of determining which of the filter outputs correspond to a lane marker by using geometric information or appearance based information is performed by a machine-learning based classifier.

15. A lane marker recognition system, comprising
a camera for receiving an image of a road, and
an image processing means including a filter bank with a plurality of different pairs of filters adapted to detect the left edge and the right edge of a specific type of a lane marker, respectively;
wherein the image processing means is configured to:
divide the image of a road into a plurality of image segments;
and for each of the image segments:
apply a plurality of the pairs of filters of the filter bank to the image segment to generate a plurality of filter outputs; and
determine which of the filter outputs correspond to a lane marker by using geometric information and appearance based information, wherein the geometric information describes allowable dimensions of a determined lane marker, and the appearance based information describes allowable pixel values of a determined lane marker.

* * * * *